United States Patent [19]
King et al.

[11] Patent Number: 5,595,308
[45] Date of Patent: Jan. 21, 1997

[54] APPARATUS AND METHOD FOR STORING COMPACT DISC JEWEL BOXES

[76] Inventors: Douglas A. King, 1602 W. 51st N., Wichita, Kans. 67204; Ryan Nelson, 8472 Lakeland Ct., Wichita, Kans. 67207

[21] Appl. No.: 306,002

[22] Filed: Sep. 14, 1994

Related U.S. Application Data

[63] Continuation-in-part of Ser. No. 986,785, Dec. 8, 1992, abandoned.

[51] Int. Cl.$^6$ .................................................. A47F 5/00
[52] U.S. Cl. .......................... 211/40; 40/124.2; 312/9.9; 211/55; 211/187
[58] Field of Search ........................ 211/40, 41, 45, 211/50, 55, 128, 187, 44; 40/124.2; 312/9.9, 9.46, 9.47, 9.51, 9.48; 206/309

[56] References Cited

U.S. PATENT DOCUMENTS

| | | | |
|---|---|---|---|
| 2,872,185 | 2/1959 | Kropp | 40/124.2 X |
| 3,507,064 | 4/1970 | Hammero | 40/124.2 |
| 4,382,517 | 5/1983 | Welsch | 211/41 |
| 4,676,372 | 6/1987 | Rager | 211/40 X |
| 4,776,623 | 10/1988 | Manning | 211/40 X |
| 5,014,859 | 5/1991 | Johnson | 211/55 |
| 5,088,619 | 2/1992 | Shank | 220/532 |
| 5,097,946 | 3/1992 | Emrich | 211/40 X |
| 5,199,577 | 4/1993 | Curtis | 211/40 |
| 5,226,704 | 7/1993 | Porter | 312/9.48 |
| 5,341,943 | 8/1994 | Fraser | 211/40 |

Primary Examiner—Robert W. Gibson, Jr.
Attorney, Agent, or Firm—Bradley P. Sylvester

[57] ABSTRACT

A compact disc box container assembly for holding a number of compact disc container boxes and for displaying, illuminating, and viewing the facial informational indicia of the disc boxes. The holder comprises a pair of opposing longitudinal sides defining a structure with angularly disposed channels, at least two tray members, and at least a pair of end caps slidably engaged to the longitudinal sides. The composition of the composing material includes a fluorescent dyestuff for the illumination of the disc boxes, especially from the edges of the elements that make-up the assembly.

7 Claims, 9 Drawing Sheets

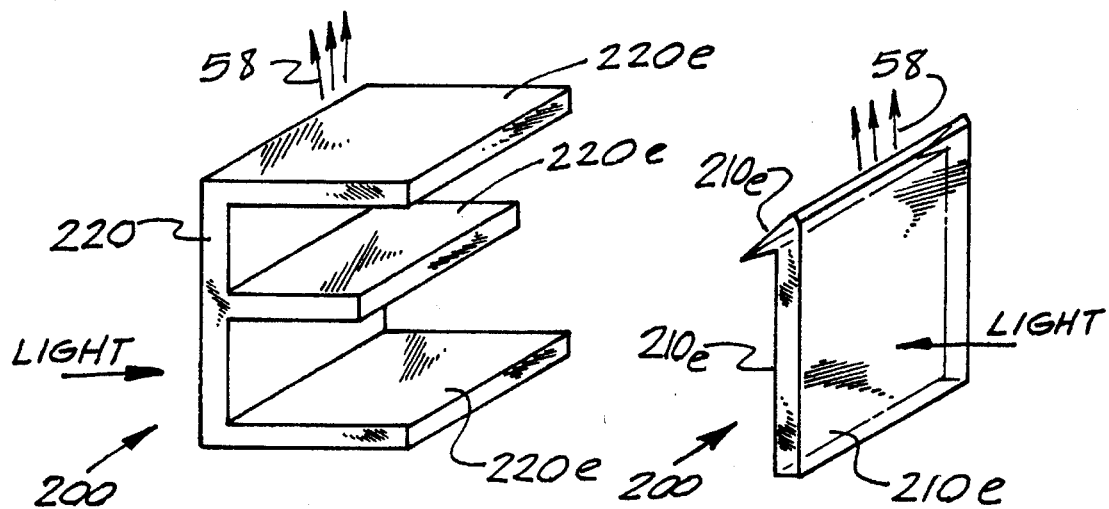
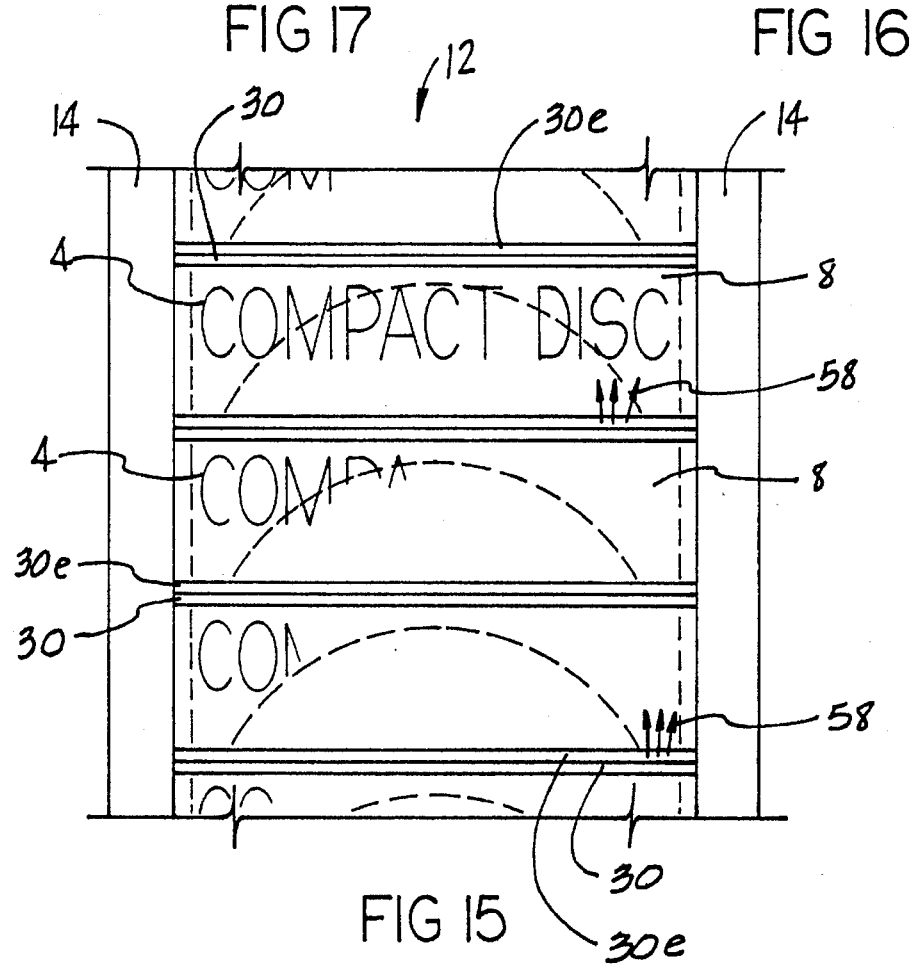

5,595,308

APPARATUS AND METHOD FOR STORING COMPACT DISC JEWEL BOXES

This is a continuation-in-part application of application having Ser. No. 07/986,785 filed Dec. 8, 1992, now abandoned. Benefit of the earliest filing date of Dec. 8, 1992 is claimed.

FIELD OF THE INVENTION

An improved storage container and means for organizing or storing compact disks in their contaning jewel boxes. More specifically, the present invention provides an improved method and an improved apparatus which allows a lighted viewing area of the compact disc's box, from the cover, rather than the spline.

DESCRIPTION OF THE PRIOR ART

A patentability investigation was conducted and the following U.S. patents were discovered: U.S. Pat. No. 4,802,587 to Armijo et al.; U.S. Pat. No. 306,663 to Larsen; U.S. Pat. No. 4,932,522 to Milovich; and U.S. Pat. No. 5,031,779 to Szenay et al. None of these prior art patents teach or suggest the particular compact disc container and method of this invention.

SUMMARY OF THE INVENTION

The present invention broadly accomplishes its desired objects by broadly providing a versatile compact disc box container or holder for holding a plurality of compact disc container boxes. The compact disc box container or holder comprises a rack means which preferably comprises a pair of opposing longitudinal side supports having a structure defining a plurality of associated and opposed angularly disposed channels. At least one tray member is slidably disposed in opposed channels. A pair of longitudinal lugs is secured to the longitudinal side supports, and at least two end cap members slidably are engaged to the longitudinal lugs. The longitudinal lugs and the end cap members comprise a dove-tail joint in cross section. A stop member is secured to the end cap members. The tray members are each manufactured from a material composition containing fluorescent dyestuffs.

It is another object of the present invention to provide a method for storing compact disc containers such that when stored a portion of the face of the compact disc container is readily seen and illuminated. The method comprises the steps of:

(a) providing a compact disc container having a planar face with informational indicia representing the contents of audio program on a compact disc contained therein;

(b) providing a compact disc holder assembly for holding a plurality of the compact disc containers and for displaying and viewing the informational indicia representing the contents of audio program on a compact disc contained therein; said compact disc holder assembly comprising at least one rack means for supporting the plurality of compact disc containers in a generally upright posture, said racks means comprising at least two longitudinal side supports having a structure defining a plurality of opposed angularly disposed channels; at least two trays slidably disposed in the opposed channels; a pair of longitudinal lugs bound to and traversing the longitudinal side supports; at least two longitudinal end cap members having a structure defining at least two longitudinal recesses for slidably receiving and engaging said longitudinal lugs; said tray members comprising a transparent plastic composition having a dyestuff agent for producing a fluorescent effect;

(c) slidably disposing the compact disc container between said two trays such that said compact disc container is viewably illuminated by the fluorescence effect of the tray member.

It is therefore an object of the present invention to provide a versatile compact disc container box holder assembly and method.

These, together with the various ancillary objects and features which will become apparent to those skilled in the art as the following description proceeds, are attained by this novel versatile compact disc container box holder as shown with reference to the accompanying drawings by way of example only, wherein:

BRIEF DESCRIPTION OF THE DRAWINGS

FIG. 15 is a partial front elevational view of one of the compact disc box racks, with compact disc containers disposed therein in a fashion such that a substantial part (i.e. top part) of each disc container can be readily viewed to determine the artist(s) of the compact disc without having to view the spline (or edge) of each disc container to determine the artist (s);

FIG. 16 is a perspective view of the number 1 composed of the high-priority florescent dye stuff contained in a transparent plastic; and FIG. 17 is a perspective view of the letter E composed of the high-priority florescent dye stuff contained in a transparent plastic.

DETAILED DESCRIPTION OF THE INVENTION

Figure 3:
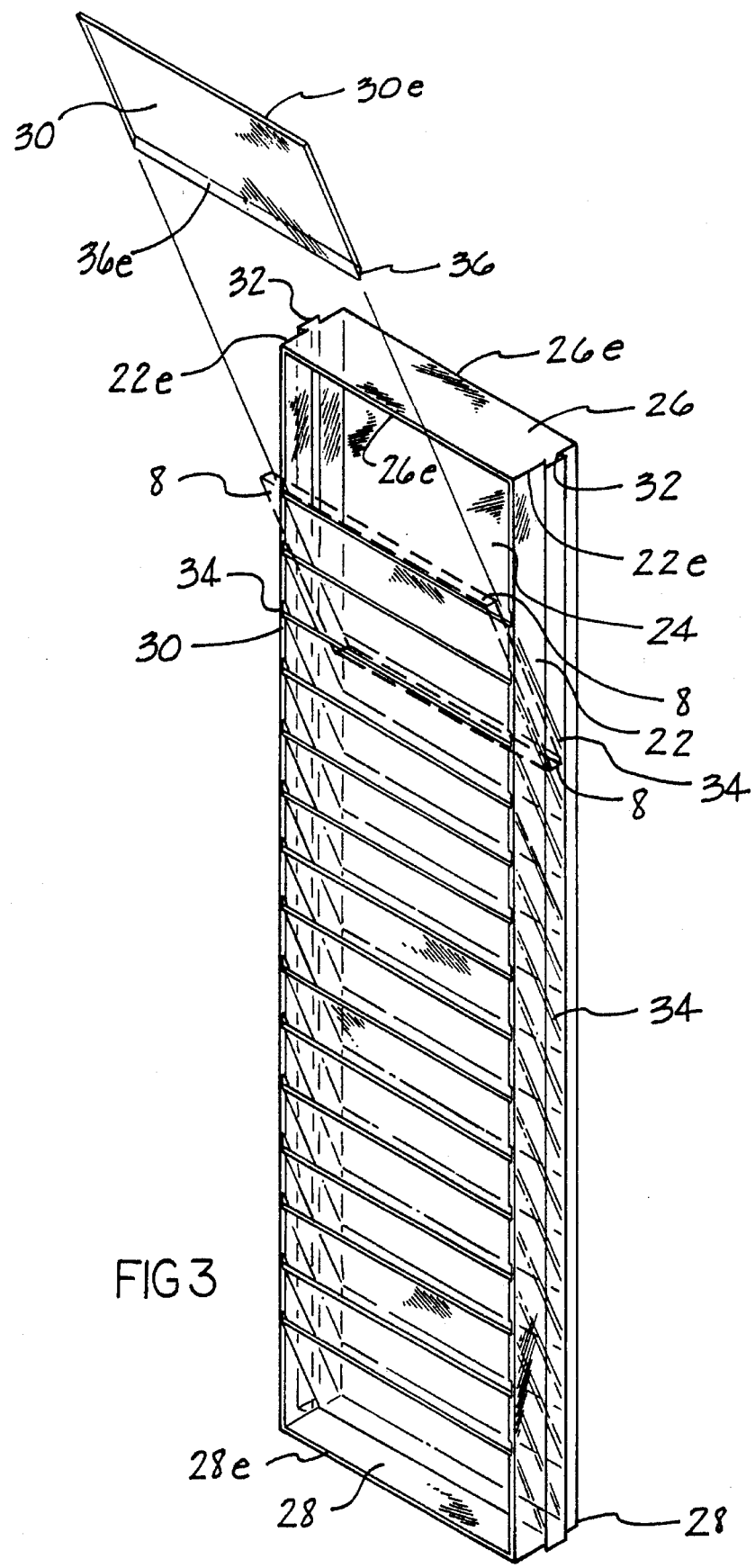
FIG. 3 is a perspective view of the compact disc box rack with a plurality of angular channels in the side supports of the rack and with one tray member slidably removed from a pair of channels in the rack.

Referring in detail now to the drawings wherein similar parts of the invention are identified by like reference numerals, there is seen compact disc box rack holder assembly (see FIG. 6), generally illustrated as 10. The holder assembly 10 comprises a plurality of rack means, generally illustrated as 12, for containing and holding a plurality of compact disc containers, each generally illustrated as 8 (see FIG. 3) and containing a compact disc 9, such that when contained and held a portion of the face of each compact disc container 8 may be readily seen to determine the artist(s) of the compact disc 9 contained in each container without having to view a spline (or edge) 11 of each container. More particularly, each disc container 8 has written or labeled informational indicia 4 thereon which represents the contents of the audio program on the compact disc 9 contained therein (see FIG. 15). With the holder assembly 10 of the present invention, the indicia 4 on the front or planar face of each of the containers 8 may be readily seen without having to look for and/or read any indicia on the spline 11 to determine audio information. When conventional compact disc containers are stored in conventional compact disc holders, the splines or edges of the disc containers have to be read to determine the artist(s) of the compact disc 9. The front or planar faces of the containers are not readily available for viewing without having to physically move the conventional disc containers. With the disc rack holder assembly 10 of the present invention, no splines 11 or edges 11 of the containers 8 have to be read to view and/or determine the artist(s) of the compact disc 9. The holder assembly 10 of the present invention also comprises a plurality of upright end cap means, generally illustrated as 14, for engaging the rack means 12 in a holder configuration.

Figure 2:
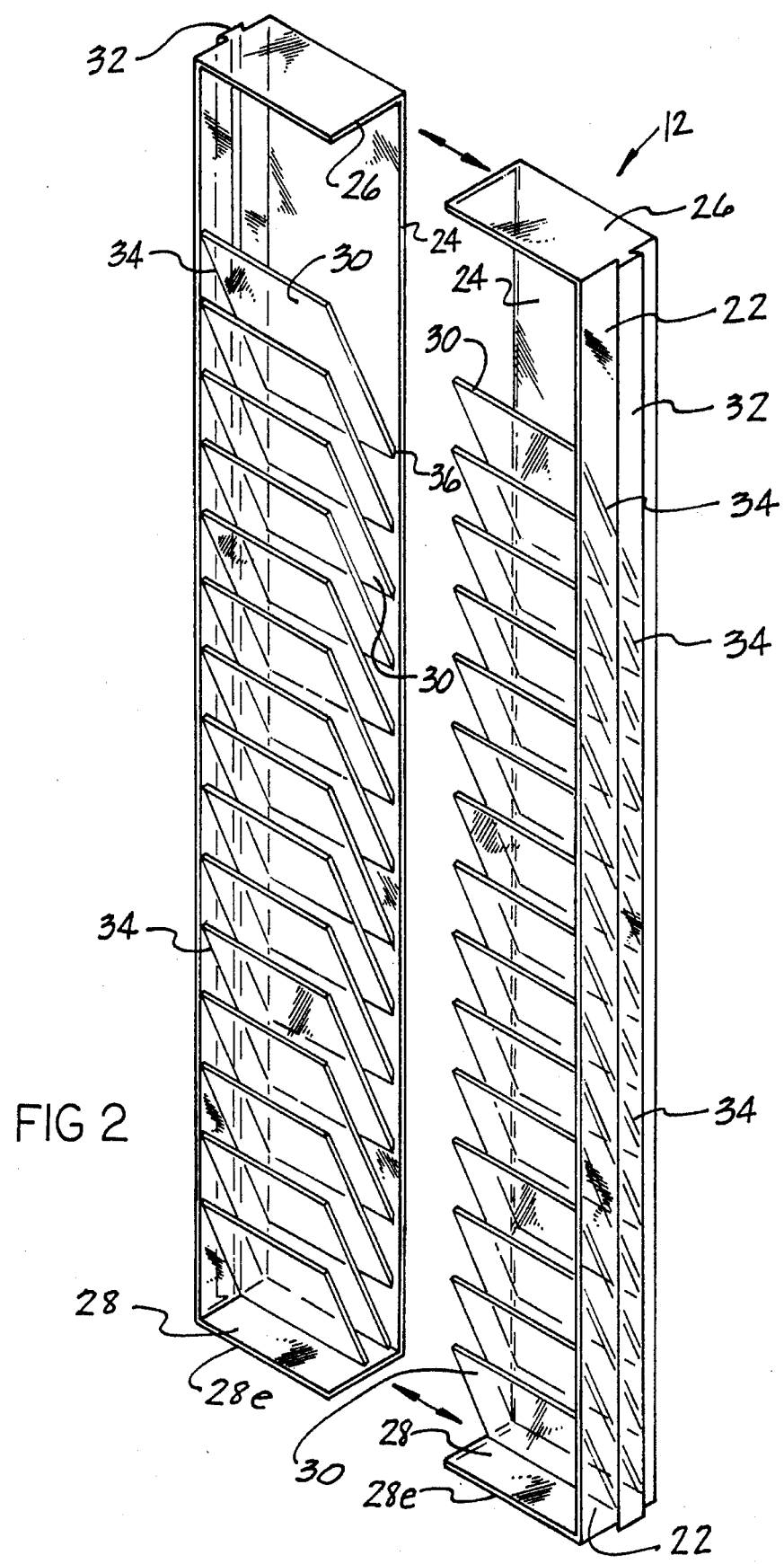
FIG. 2 is a segmented vertical perspective view of the compact disc box rack taken in the direction of the arrows and along the plane of line 2—2 in FIG. 1.
Figure 4:
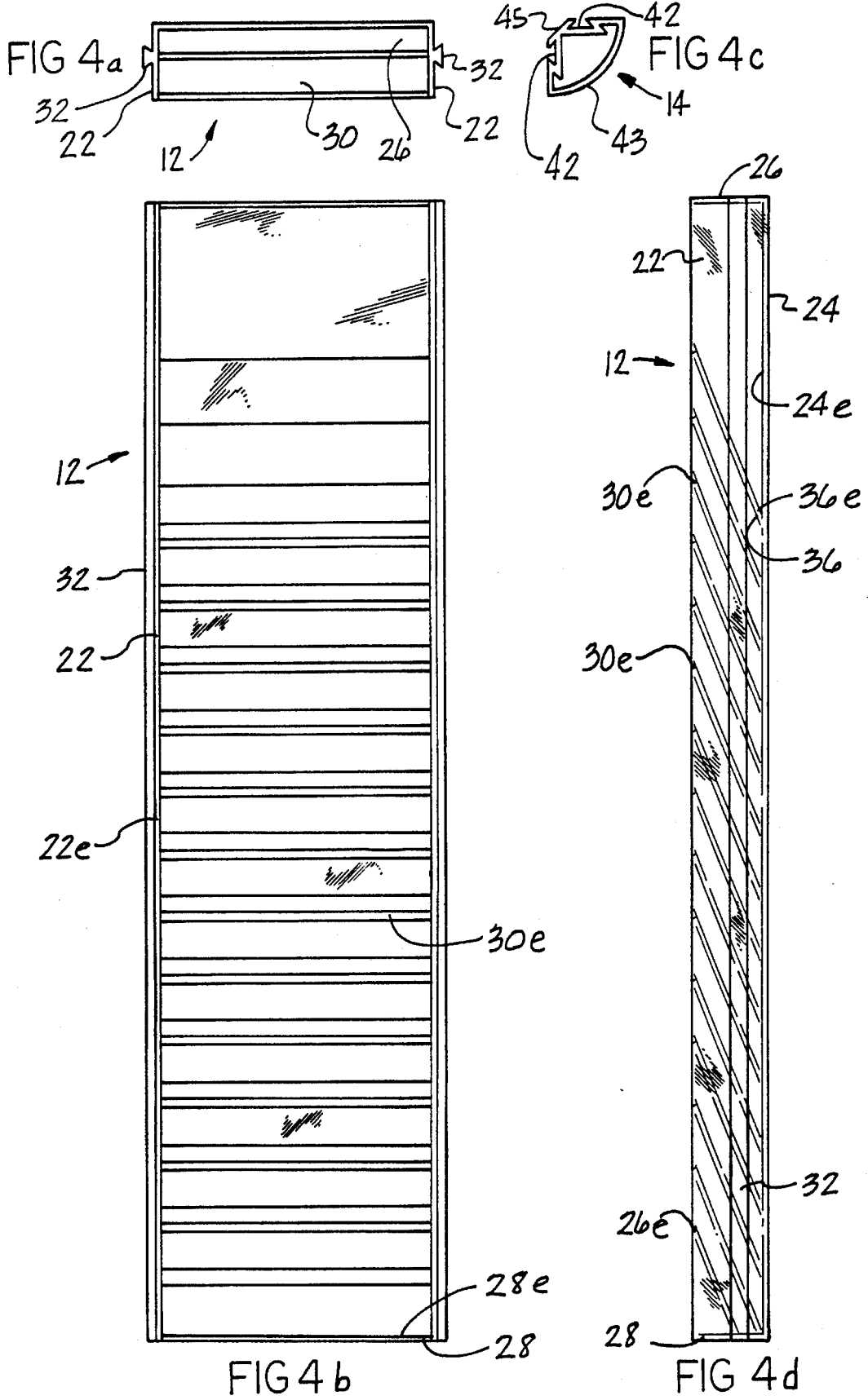
FIG. 4a is a top plan view of the compact disc box rack.
FIG. 4b is a front plan elevational view of the compact disc box rack.
FIG. 4c is a top plan view of one embodiment of the upright end cap used in the compact disc box holder.
FIG. 4d is a side elevational view of the compact disc box rack.

The compact disc box rack means 12 comprises (see FIG. 3) a pair of opposing longitudinal side supports 22, each formed with a plurality of opposing angularly disposed channels 34 (or openings). A longitudinal lug 32 is engaged to each of the side supports 22 and traverses the longitudinal length of the side supports 22. A back support member 24, a top member 26, and a bottom member 28, are all connected to the side supports 22—22. A plurality of tray members 30 is slidably disposed in the angularly disposed channels 34 (see FIG. 2). The longitudinal lugs 32 define a structure comprising a male dove-tail protrusion joint (in horizontal cross section) as best shown in FIG. 4a. Each tray member 30 comprises a structure that terminates in an angled edge 36, respective to the plane of the tray 30, along the back edge of the tray 30 such that upon disposal in the channels 34 the angled edge 36 flushes with the back 24 of the rack means 12.

Each of the rack means 12 is supported by an upright end cap means 14 which has a number of embodiments. In the embodiment in FIG. 4c, the upright end cap means 14 comprises a structure defining a pair of female dove-tail recesses 42 (in horizontal cross-section), for slidably engaging the longitudinal lugs 32. As best shown in FIG. 4c, the upright end cap means 14 also comprises an arcuate face 43 and an upright back 45 that assist in forming the dove-tail recesses 42.

Figure 1:
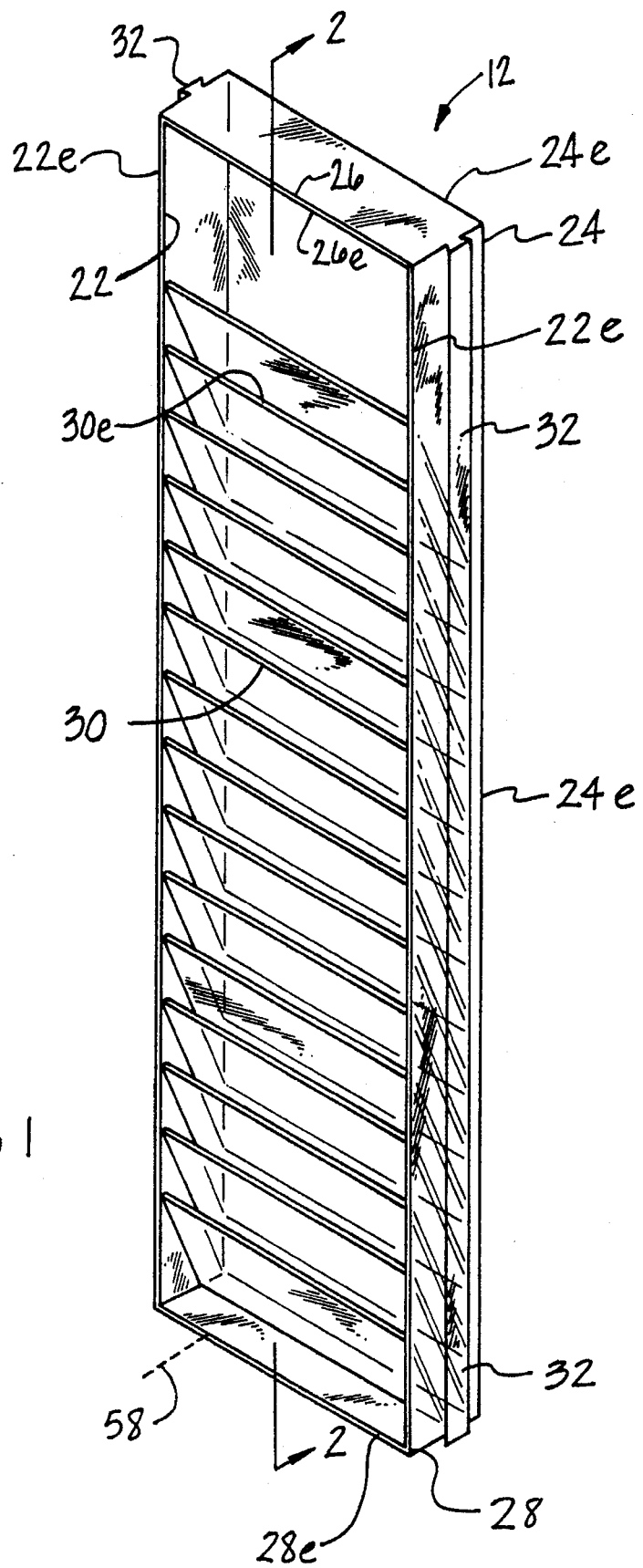
FIG. 1 is a perspective view of the compact disc box rack.

The compact disc rack holder assembly 10 may be manufactured from or by any suitable material, such as plastic (polyethylene, polypropylene, ABS, PVC, etc.). Preferably, the holder assembly 10, especially each of the rack means 12, is manufactured from a fluorescent transparent plastic such as by way of example only a polymethylmethacrylate sold under the product name LISA VP KL-39402 E 6IR of Bayer Aktiengelsellschaft, Leverkusen, Federal Republic of Germany. More preferably, the holder assembly 10 is manufactured of a light-collecting plastic and/or system, as more particularly described in U.S. Pat. Nos. 4,492,648 and 4,526,705, both of which are fully incorporated herein by reference thereto as if repeated verbatim hereafter. The plastic and/or system contains a dyestuff agent that produces a fluorescent effect. The light-collecting plastic is able to collect and conduct light which results from the extreme clarity of the transparent plastics and the fluorescence of the dyestuffs used, which are evenly distributed throughout each plastic part. Fluorescence is governed by the laws of geometric optics concerning light refraction and total internal reflection when light passes from a medium of higher optical density (the polymer plastic) to one of lower optical density (air). These laws determine that in the plastics used in the present invention to manufacture the rack holder assembly 10, only a small proportion of the fluorescent light can be emitted at the interface between the plastic and the air. Most of it is repeatedly reflected back into the material (total internal reflection) and, in this way, is transmitted through the polymer plastic until it comes to an interface through which it can emerge. Such interfaces are the perimeter edges or other deliberately created "edges" on the plastic to which the collected light can be conducted. The plastics employed in the present invention are colored, transparent polymers with special optical properties which collect or absorb light from their surroundings, conducting it within the material and re-emitting a large proportion of the light in concentrated form at the edges; such as edges 22e of the side supports 22, edge 24e of the back 24, edges 30e and 36e of the trays 30, edges 26e of the top member 26 (see FIG. 1) and edges 28e of the bottom 28. This produces the edge brightness for the holder assembly 10 such that edges 22e, 24e, 26e, 28e, 30e, 36e (etc.) glow luminating the face of the compact disc containers 8 when light hits the back 24, the sides 22—22, the top member 26, and the trays 30, and any other element of the assembly 10 which is manufactured from a transparent plastic containing the dyestuff agent. The edge brightness may be enhanced by the employment of a light 100 that is to glow when electrical cord 102 conducts electricity after a plug 104 is disposed in any suitable electrical outlet. It is to be understood that the planar surfaces of the elements (e.g. trays 30, sides 22, etc.) may also emit some light but the brightest effects will be produced from and at the edges of the elements (e.g. 30e, 22e, etc.)

Referring now to FIGS. 16 and 17 for another feature of the present invention, there is seen indicia matter, generally illustrated as 200, which is manufactured of the plastic and/or the systems containing the dye stuff agent for producing the fluorescent effect, all of which have been immediately set forth with particularity, and which may be placed on the apparatus 10 of the present invention at any suitable location. The indicia matter 200 may be a number, such as the number "1" represented as 210 in FIG. 16, or a letter, such as the letter "E" represented as 220 in FIG. 17, or any other indicia suitable for being placed on the apparatus 10. Edges 210e and 220e of the indicia matter 200 produce light rays 58 when light hits the sides of the indicia 200.

Thus, one of the salient points of the present invention is the employment of a light-collecting system and/or plastic for holding and storing compact disc containers 8 while simultaneously producing novel optical properties on the compact disc containers 8 that result from the incorporation of high-priority fluorescent dyestuffs (as more particularly described in U.S. Pat. Nos. 4,492,648 and 4,526,705 which have been fully incorporated herein as if repeated verbatim hereafter) into the transparent polymers of extreme clarity. As best shown in FIG. 15, the edges (e.g. edges 30e, etc.) produce light rays 58 (or light enhanced rays) to produce a fluorescent effect on the containers 8 and indicia 4. While edges 22e, 24e, 26e, 28e 30e, 36e, are the only edges which have been specifically identified as producing light rays 58, it is to be understood that the spirit and scope of the invention includes any edges of any other elements (e.g. upright end cap means 14) which are produced with a transparent plastic containing the dyestuff agent.

Figure 5:
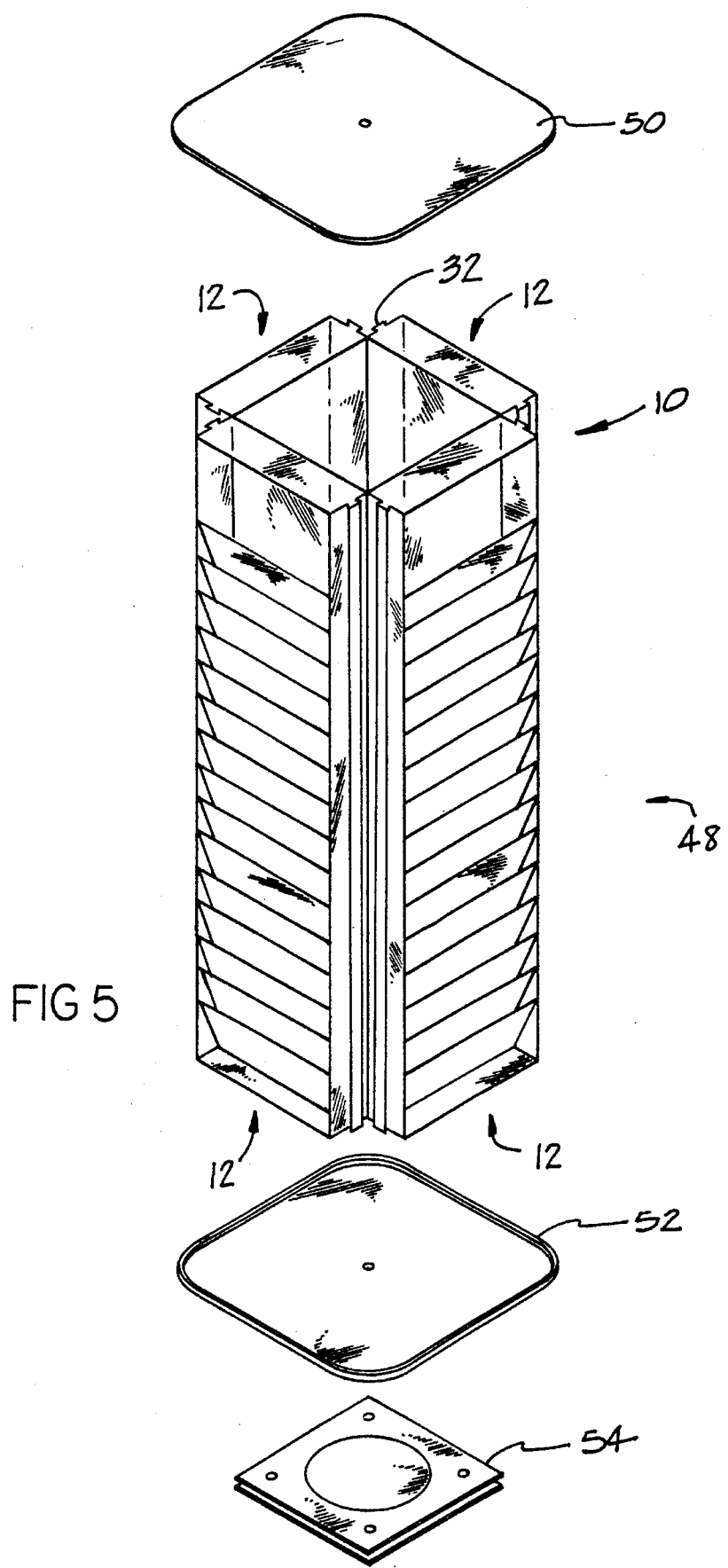
FIG. 5 is an exploded perspective segmented view of several of the compact disc box racks in a lazy-susan holder configuration, without any upright end caps employed for holding the compact disc box racks in a generally upright posture.
Figure 6:
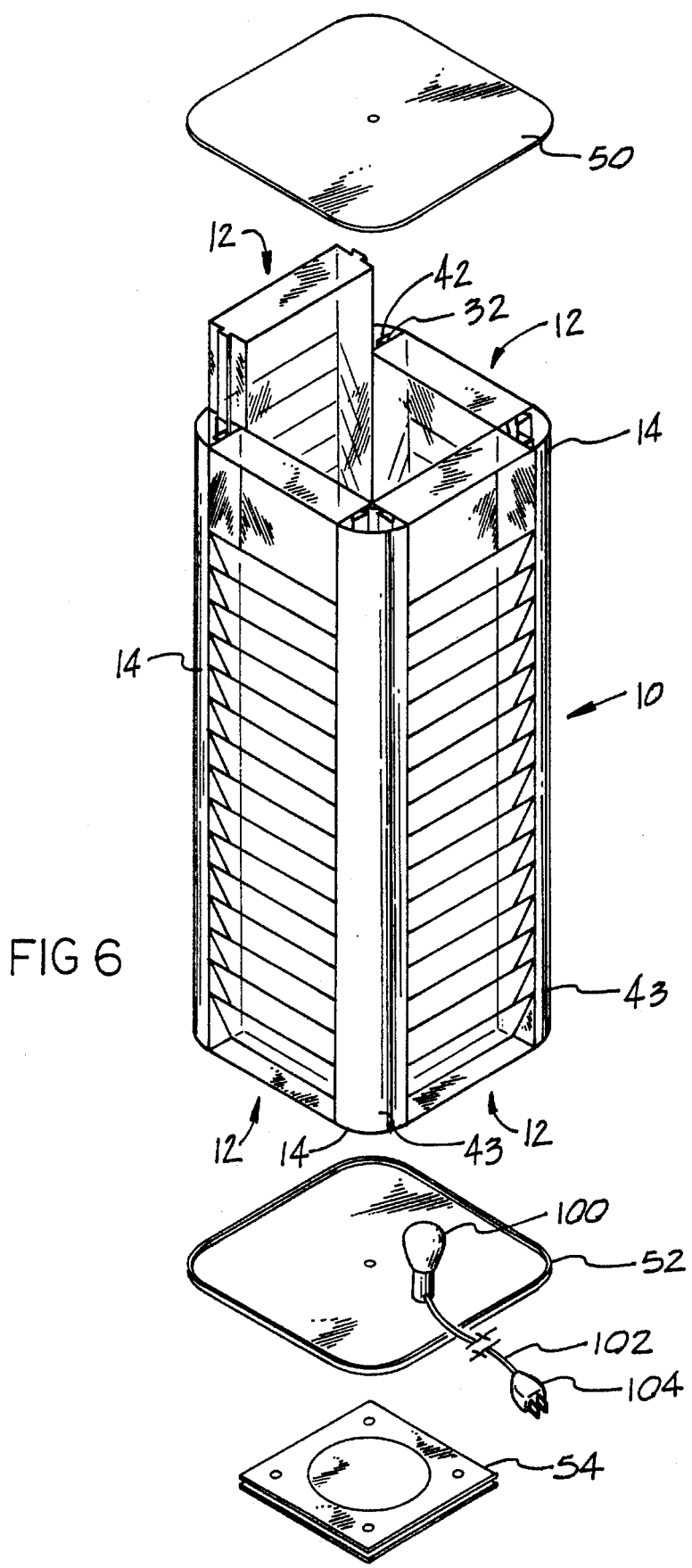
FIG. 6 is an exploded perspective view of the compact disc box racks slidably engaging four upright end caps in a lazy-susan holder configuration, with one of the racks in the process of slidably engaging a pair of the upright end caps and with a light being furnished on the inside of the lazy-susan holder for illuminating the racks holding compact disc containers or jewel boxes.

The compact disc holder assembly 10 may be configured in one of several ways, as shown by way of example only in FIG. 5 and FIG. 6 as a lazy-susan configuration 48. The lazy susan configuration 48 comprises four (4) rack means 12, four (4) upright end cap means 14, a top cover (plate) member 50, a bottom cover (plate) member 52 and a lazy-susan carousel assembly 54. The bottom cover member 52 supports all of the racks 12 to prevent all of the same from sliding away from the four (4) upright cap means 14 by the longitudinal lugs 32 sliding out of the recesses 42. The top cover 50 covers the tops of the racks 12 and the upright end cap means 14. It is apparent that the cover (plate) member 50 and the bottom (plate) member 52 may be manufactured from a transparent plastic containing a fluorescent dyestuff agent.

Figure 14:
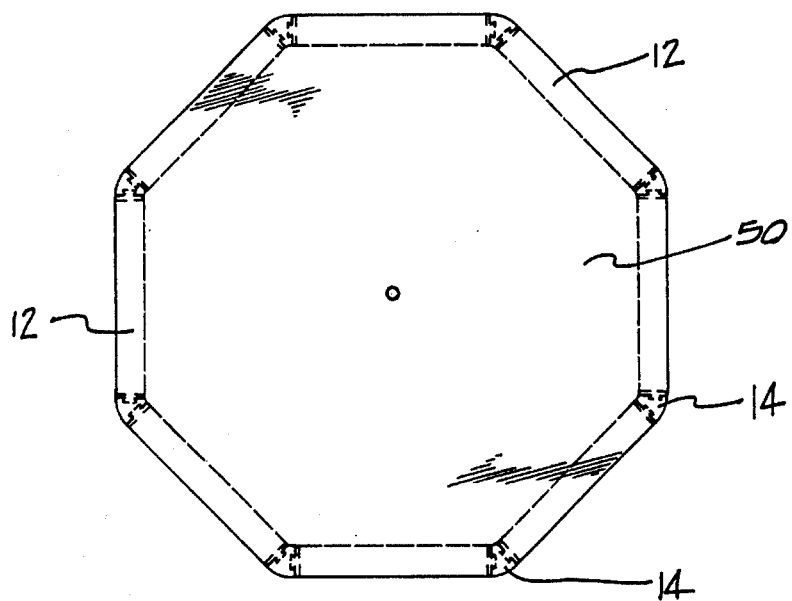
FIG. 14 is a top plan view of eight of the compact disc box racks and eight angular upright end caps in an octagonal lazy-susan holder configuration, with the dotted line configuration representing the compact disc racks and the upright end caps.
Figure 13:
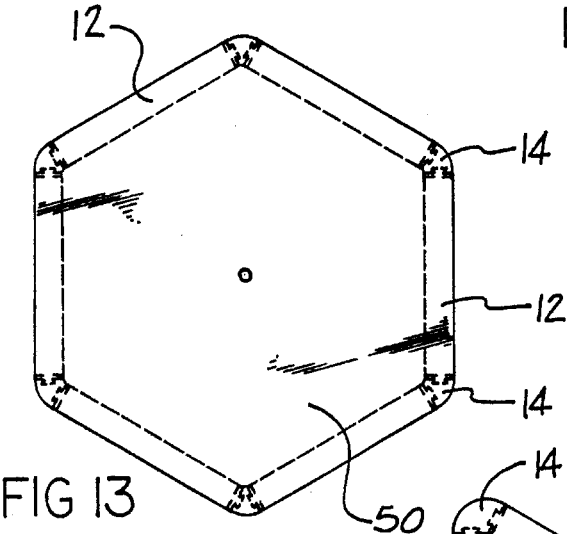
FIG. 13 is a top plan view of six of the compact disc box racks and six angled upright end caps in an hexagonal lazy-susan holder configuration, with the dotted line configuration representing the compact disc racks and the upright end caps.
Figure 12:
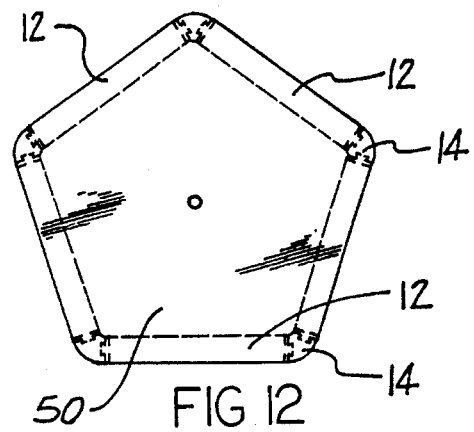
FIG. 12 is a top plan view of five of the compact disc box racks and five angled upright end caps in a pentagonal lazy-susan holder configuration, with the dotted line configuration representing the compact disc racks and the upright end caps.
Figure 11:
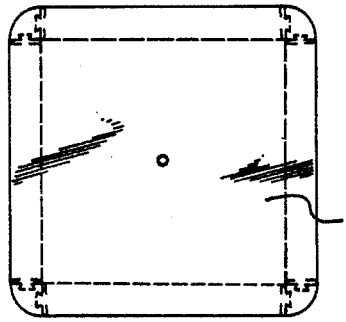
FIG. 11 is a top plan view of four of the compact disc box racks and four angled upright end caps in a square lazy-susan holder configuration, with the dotted line configuration representing the compact disc racks and the upright end caps.
Figure 10:
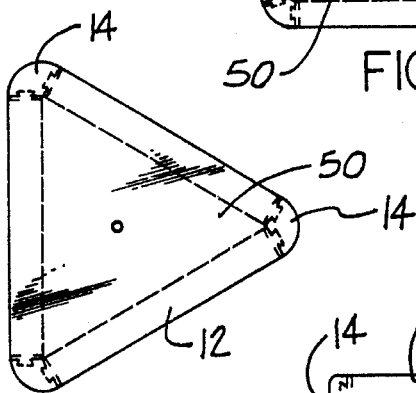
FIG. 10 is a top plan view of three of the compact disc box racks and three angled upright end caps in a triangular lazy-susan holder configuration, with the dotted line configuration representing the compact disc racks and the upright end caps.

The compact disc holder assembly 10, when configured as a lazy-susan type holder may take on a variety of shapes as best shown in FIGS. 10 through 14. FIG. 10 shows the compact disc holder assembly 10 in a triangular configuration. FIG. 11 shows the compact disc holder assembly 10 in a square configuration. FIG. 12 shows the compact disc holder assembly 10 in a pentagonal configuration. FIG. 13 shows the compact disc holder assembly 10 in an hexagonal configuration. FIG. 14 shows the compact disc holder assembly 10 in an octagonal configuration. Obviously, the rack 14 (especially the lugs 32) and the upright end cap means 14 (especially the recesses 14) may be conveniently configured to produce any of the variety of shapes shown in FIGS. 10–14.

Figure 7:
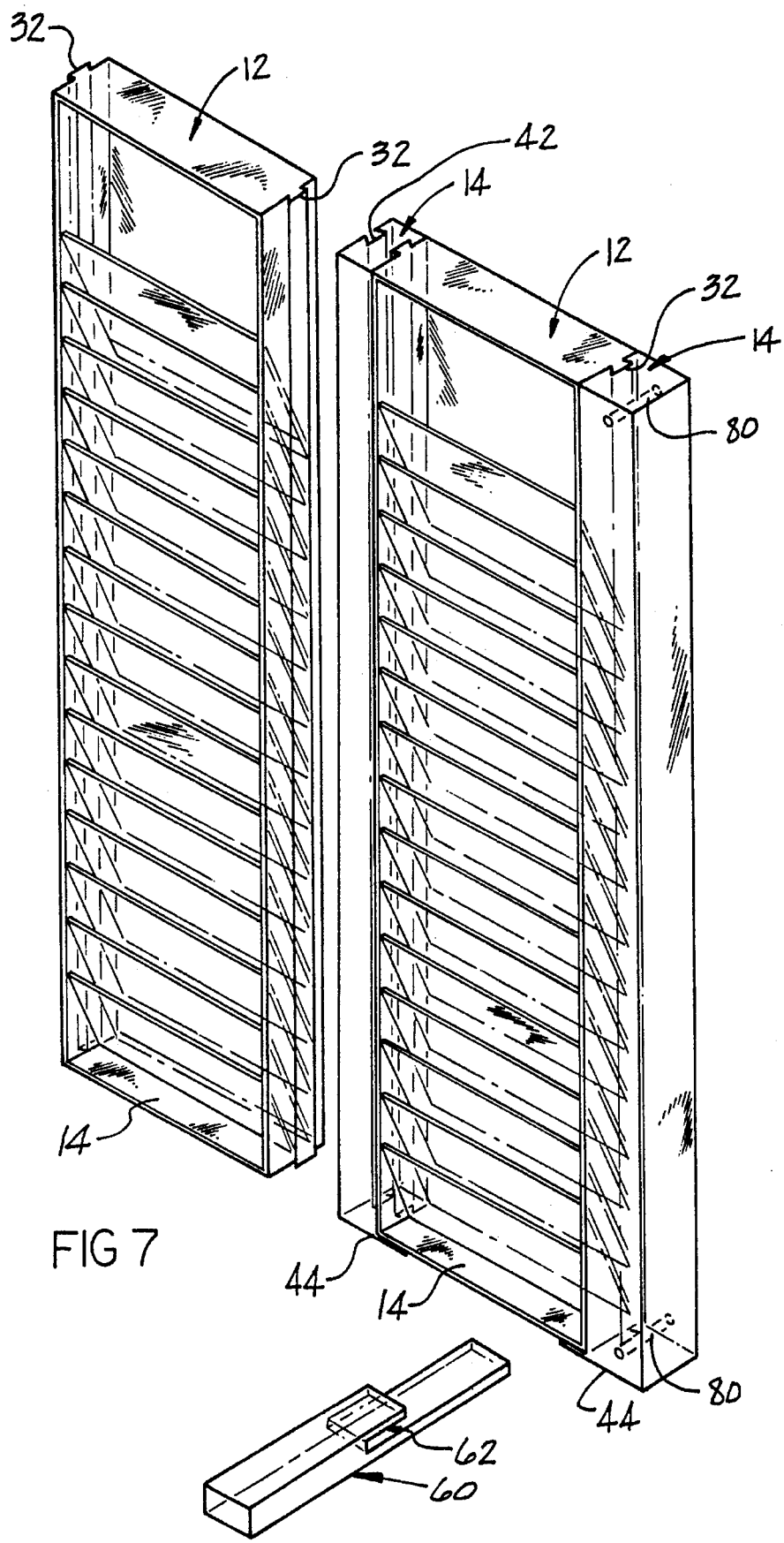
FIG. 7 is a perspective view of two of the compact disc box racks showing a terminating upright end cap and a coupling upright end cap engaged to one of the racks, and a segmented stand for slidably engaging the bottom of one the racks.
Figure 8:
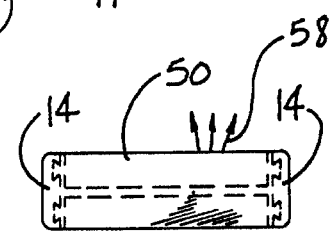
FIG. 8 is a top plan view of two of the compact disc box racks coupled together by a pair of terminating upright end caps in a back to back holder configuration, with the dotted line configuration representing the pair of compact disc racks and the end caps.
Figure 9:
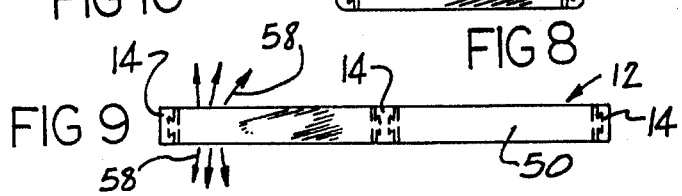
FIG. 9 is a top plan view of two of the compact disc box racks coupled in a side by side relationship with an intermediate coupling upright end cap and two terminating upright end caps in a linear configuration, with the dotted line configuration representing the compact disc racks and the upright end caps.

The compact disc holder assembly may be additionally configured as a standing rack 58 (refer to FIGS. 7 through 9); and as best shown in FIG. 7, comprises at least one of said rack means 12, at least two of the upright end cap means 14, and a stop or bottom member 44. The stop member 44 is engaged to the bottom of the end cap means 14 which in this embodiment of the invention is square or rectangular shape in configuration and may have longitudinal bores 80 wherethrough bolts, screws (not shown) or the like may pass to mount to an upright or free standing surface, such as a wall or the like. Alternatively, as further shown in FIG. 7 there is seen a stand means 60 having a recess 62 to slidably receive and retain the bottom member 44 for supporting the compact disc holder assembly 10 in a generally upright position. The standing rack 58 may also be configured with a pair of the rack means 12 engaged by the end cap means 14 with the back 24 of one of the rack means 12 to the back 24 of another of the rack means 24 (refer to FIG. 8).

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. A method for storing a compact disc container such that when stored a portion of the face of the compact disc container is readily seen and illuminated, comprising the steps of:

(a) providing a compact disc container having a planar face with informational indicia representing the contents of audio program on a compact disc contained therein;

(b) providing a compact disc holder assembly for holding a plurality of the compact disc containers and for displaying and viewing the informational indicia representing the contents of audio program on a compact disc contained therein; said compact disc holder assembly comprising at least one rack means for supporting the plurality of compact disc containers in a generally upright posture, so that the face of each compact disc may be readily seen to determine the artist(s) of the compact disc contained in each container without having to view the spline or edge of each container, said rack means comprising at least two longitudinal side supports having a structure defining a plurality of opposed angularly disposed channels; at least two trays slidably disposed in the opposed channels; a pair of longitudinal lugs bound to a traversing the longitudinal side supports; at least two longitudinal end cap members having a structure defining at least two longitudinal recesses for slidably receiving and engaging the longitudinal lugs, said tray members comprising a transparent plastic composition having a dyestuff agent for producing a florescence effect;

(c) slidably disposing the compact disc container between said two trays such that when contained and held a portion of the face of each compact disc may be readily seen to determine the artist(s) of the compact disc contained in each container without having to view the spline or edge of each container, and where the face of each compact disc container is viewably illuminated by the florescence effect of the tray members.

2. The method of claim 1 wherein said fluorescence effect is produced at edges of the tray members.

3. An apparatus for storing a compact disc container box comprising a compact disc holder assembly for holding a plurality of the compact disc containers and for displaying and viewing the informational indicia representing the contents of audio program on a compact disc contained therein; said compact disc holder assembly comprising at least one rack means for supporting the plurality of compact disc containers in a generally upright posture, said rack means comprising at least two longitudinal side supports having a structure defining a plurality of opposed angularly disposed channels; at least two trays slidably disposed in the opposed channels, with said tray members comprising a transparent plastic composition having a dyestuff agent for producing a florescence effect.

4. The apparatus of claim 3 additionally comprising two tray members slidably disposed in the opposed channels.

5. The apparatus of claim 4 additionally comprising a pair of longitudinal lugs bound to and traversing the longitudinal side supports.

6. The apparatus of claim 5 additionally comprising at least two end cap members each having a recess for slidably receiving and engaging said longitudinal lug.

7. The apparatus of claim 3 wherein said rack means comprising a transparent plastic composition having a dyestuff agent such that said rack means has light gathering and light emitting properties.

* * * * *